United States Patent [19]
Graton et al.

[11] Patent Number: 5,090,945
[45] Date of Patent: Feb. 25, 1992

[54] TORSION DAMPING DEVICE, IN PARTICULAR A FRICTION CLUTCH FOR AUTOMOTIVE VEHICLES

[75] Inventors: Michel Graton, Paris; André Dalbiez, Argenteuil, both of France

[73] Assignee: Valeo, Paris, France

[21] Appl. No.: 543,370

[22] Filed: Jun. 26, 1990

[30] Foreign Application Priority Data

Jun. 27, 1989 [FR] France ................... 8908541

[51] Int. Cl.$^5$ .................. F16D 3/12; F16D 3/66
[52] U.S. Cl. ........................... 464/64; 464/68
[58] Field of Search .................... 464/64–68; 192/106.1, 106.2

[56] References Cited

U.S. PATENT DOCUMENTS

| | | | |
|---|---|---|---|
| 4,433,770 | 2/1984 | Loizeau et al. | 192/106.2 |
| 4,679,679 | 7/1987 | Lech, Jr. et al. | 192/106.2 |
| 4,698,045 | 10/1987 | Billet et al. | 464/68 |

FOREIGN PATENT DOCUMENTS 0079727 5/1983 European Pat. Off. .
3810922 10/1988 Fed. Rep. of Germany .

Primary Examiner—Joseph J. Hail, III
Assistant Examiner—William G. Battista, Jr.
Attorney, Agent, or Firm—Longacre & White

[57] ABSTRACT

This invention relates to a torsion damping device, in particular for automotive vehicles, comprising two coaxial parts with a hub and a damper plate, and also having an intervention member for modifying the operating characteristics of the torsion damping device. The intervention member is able to occupy two working positions, and comprises at least one weight, moveable radially under the influence of centrifugal force and comprising a trapezoidal tenon which is engaged in a mortice of complementary trapezoidal shape formed in the hub, the weight being biassed against the action of centrifugal force by a resilient spring bearing at one end on the damper plate so as to urge the weight towards the base of the mortice.

6 Claims, 2 Drawing Sheets

TORSION DAMPING DEVICE, IN PARTICULAR A FRICTION CLUTCH FOR AUTOMOTIVE VEHICLES

FIELD OF THE INVENTION

This invention relates to torsion damping devices, in particular friction clutches of the kind comprising at least two coaxial parts which are mounted for rotation with respect to each other, within the limits of a predetermined angular displacement and against the action of resilient members which are adapted to act circumferentially between the coaxial parts over at least a range of the angular displacement, and at least one intervention member, which, for the purpose of modifying the operating characteristics of the torsion damping device over at least a portion of the range of displacement, is responsive to centrifugal force exerted against the action of return means, each intervention member being accordingly movable reversibly between a rest position, corresponding to a relatively low first range of values of rotational velocity in which the intervention member modifies the operating characteristics of the torsion damping device, and a working position corresponding to larger values of the rotational velocity.

BACKGROUND OF THE INVENTION

One device of the above kind is described in U.S. Pat. No. 4,433,770 and in the corresponding French published patent application No. FR 2 495 255A. In that document, one of the coaxial parts comprises a hub and the other comprises two guide rings which are disposed on either side of a damper plate. The damper plate is fixed with respect to the hub, for limited rotation with respect to the latter through a loose meshing means. The loose meshing means comprise two co-operating sets of teeth defining a circumferential clearance between them. The intervention member is mounted rotatably and is adapted to come into engagement on the outer periphery of the hub, which constitutes in this connection a fixed abutment for the intervention member. A return spring is arranged to bear on the latter.

In a first range of relatively low values of rotational velocity of the assembly, all of these arrangements allow the resilient members of lesser stiffness which form part of the torsion damping device to act by themselves or to render these resilient members inoperative. The intervention member thus enables those noises which occur when the rotational velocity is below the slow running speed of the engine to be eliminated. This is the case for example when, with the engine rotating, declutching is followed by re-engagement of the clutch.

In a development of the above principle, a retractable abutment element is interposed on the path of rotation of the intervention member, for the temporary retention of the intervention member, in such a way that the latter may occupy one or other of two working positions, namely an intermediate position and a terminal position. In the intermediate position, which the intervention member occupies in a second range of values of rotational velocity of the assembly, greater than those of the above mentioned first range, the intervention member is in engagement against the retractable abutment element; and in this position it has no effect on the operating characteristics of the torsion damping device.

The intervention member can occupy its terminal position after the retractable abutment element has been withdrawn. In this terminal position, which corresponds to a third range of values of rotational velocity greater than that of the second range of values, the intervention member acts once again to modify the operating characteristics of the device.

The intervention member thus acts to eliminate not only "clunk" noises, but also out of balance phenomena which occur during running, in particular when the driver releases his foot from the accelerator and then depresses it again.

However, these arrangements are quite complicated, because they call for a rotatable mounting for the intervention member. In addition, this member is arranged outside the volume delimited by the guide rings. Accordingly, the assembly occupies considerable axial space; in addition, the intervention member is susceptible to being damaged before the torsion damper has been mounted in the vehicle, for example during warehousing and/or careless handling.

DISCUSSION OF THE INVENTION

An object of the present invention is to overcome the above disadvantages and to provide a torsion damping device which is economical but which has an intervention member that is active for its rest position and having two working positions, besides also affording protection to the intervention member and giving other advantages.

In accordance with the invention, a torsion damping device, of the kind defined under "Field of the Invention" above, in which one of the said coaxial parts comprises a hub, and the other comprises two guide rings disposed on either side of a damper plate coupled in rotation to the hub through loose meshing means, is characterised in that: (a) each intervention member comprises at least one movable weight carried by the damper plate in a guide housing which is fixed with respect to the latter, each weight including a tenon which is of trapezoidal shape and which projects from the inner periphery of the damper plate; and (b) the hub carries, at its outer periphery for co-operating with the tenon or a respective one of the tenons, a mortice having a trapezoidal shape complementary with the associated tenon, and being such that the latter can penetrate into the mortice with circumferential and radial clearance under the action of the return means, the return means acting between the damper plate and the tenon so as to urge the latter towards the base of the mortice in the first range of values of rotational velocity of the assembly, in such a way that each intervention member is able to occupy one or the other of two working positions, namely an intermediate position which corresponds to a second range of values of the rotational velocity of the assembly greater than that of the first range of values, with the intervention member meshing, in the intermediate position, with a clearance in the mortice without any effect on the operating characteristics of the device, and a terminal position which corresponds to a third range of values of the rotational velocity of the assembly greater than that of the second range of values, whereby the intervention member again acts on the operating characteristics of the torsion damping device, in this position by wedging action with the mortice.

The invention affords better protection to the intervention member due to the presence of the guide rings, besides reducing the axial bulk of the device. Where the latter consists of a friction clutch for an automotive vehicle, the intervention member does not run the risk of interfering with the diaphragm of the clutch. This is in contrast with the arrangement described in the patent document cited above.

In addition, the intervention member preferably forms part of the loose meshing means, without the presence of a retractable abutment element being necessary.

It will be appreciated that advantage is taken of the mortice, in that the intervention member cooperates with the base of the mortice in its rest position. In the second or terminal working position, the tenon and mortice are preferably dovetailed with each other.

It should be noted that the guide housing formed in the damper plate extends laterally through the latter, but that it is preferably closed at the sides by friction rings which are incorporated on either side of the damper plate in the torsion damper.

The description which follows illustrates the invention, by way of example only, with reference to the accompanying drawings.

DESCRIPTION OF PREFERRED EMBODIMENTS OF THE INVENTION

Figure 1:
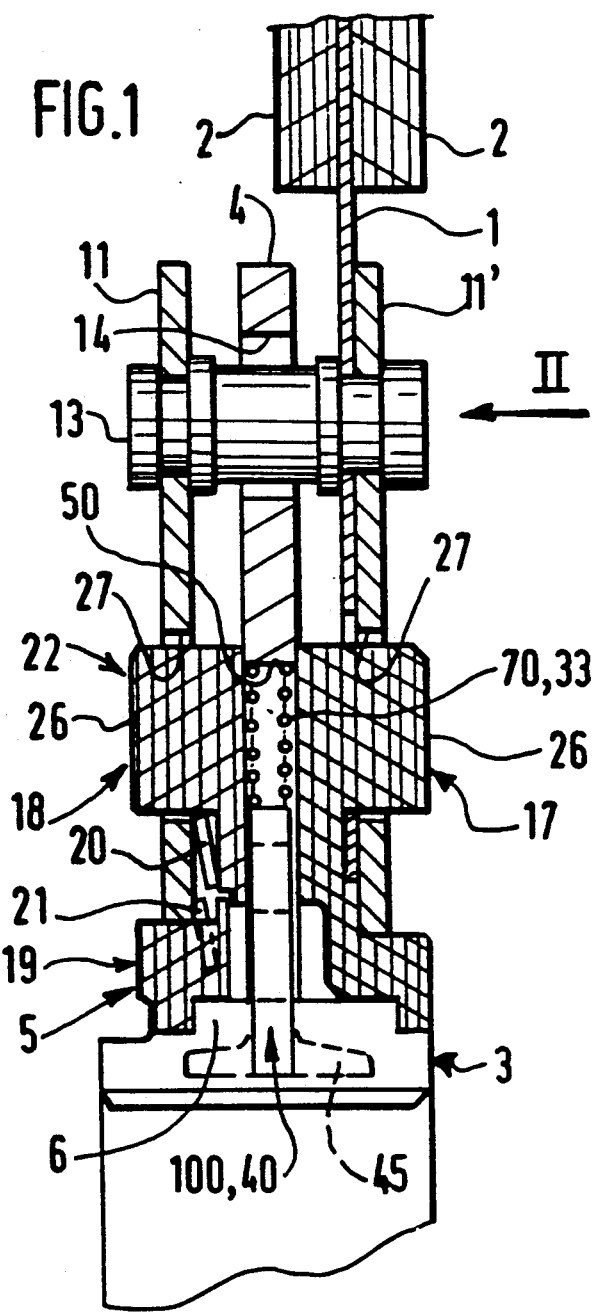
FIG. 1 is a half view in axial cross section showing a torsion damping device according to the invention.
Figure 3:
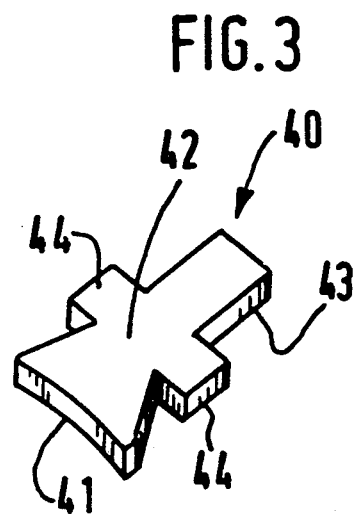
FIG. 3 is a perspective view of a weight.

In the embodiments shown in the drawings, the torsion damping device is in the form of a friction clutch for automotive vehicles. In FIG. 1, this friction clutch includes a clutch disc or carrier plate 1 carrying friction liners 2, together with a hub 3. The carrier plate 1 and hub 3 are movable in rotation with respect to each other within the limits of a predetermined angular displacement, the carrier plate 1 and hub 3 being coupled together by means of two torsion damping devices arranged for stepped operation, i.e. so as to come into operation one after the other. These devices comprise a predamper and a main damper, the predamper being weaker than the main damper.

The carrier plate 1 is adapted by virtue of its friction liners 2 to be gripped between the pressure plate and reaction plate (not shown) of the clutch, which are arranged to be rotatable with the crankshaft of the engine of the vehicle. The carrier plate is able to be mounted, through its hub 3, on the input shaft of the gearbox, for rotation with the latter. The carrier plate 1 is made of spring steel.

The predamper is constructed as follows. A damper plate 4 is mounted for rotational movement with respect to the hub 3, against the action of a second friction means 5 and within the limits of a predetermined angular displacement. In this example, the hub 3 has a flange 6 at its outer periphery, aligned axially with, and facing, the inner periphery of the damper plate 4. A loose meshing means 7, which will be described in more detail below, is formed partly on the inner periphery of the damper plate 4 and partly in the flange 6.

Figure 2:
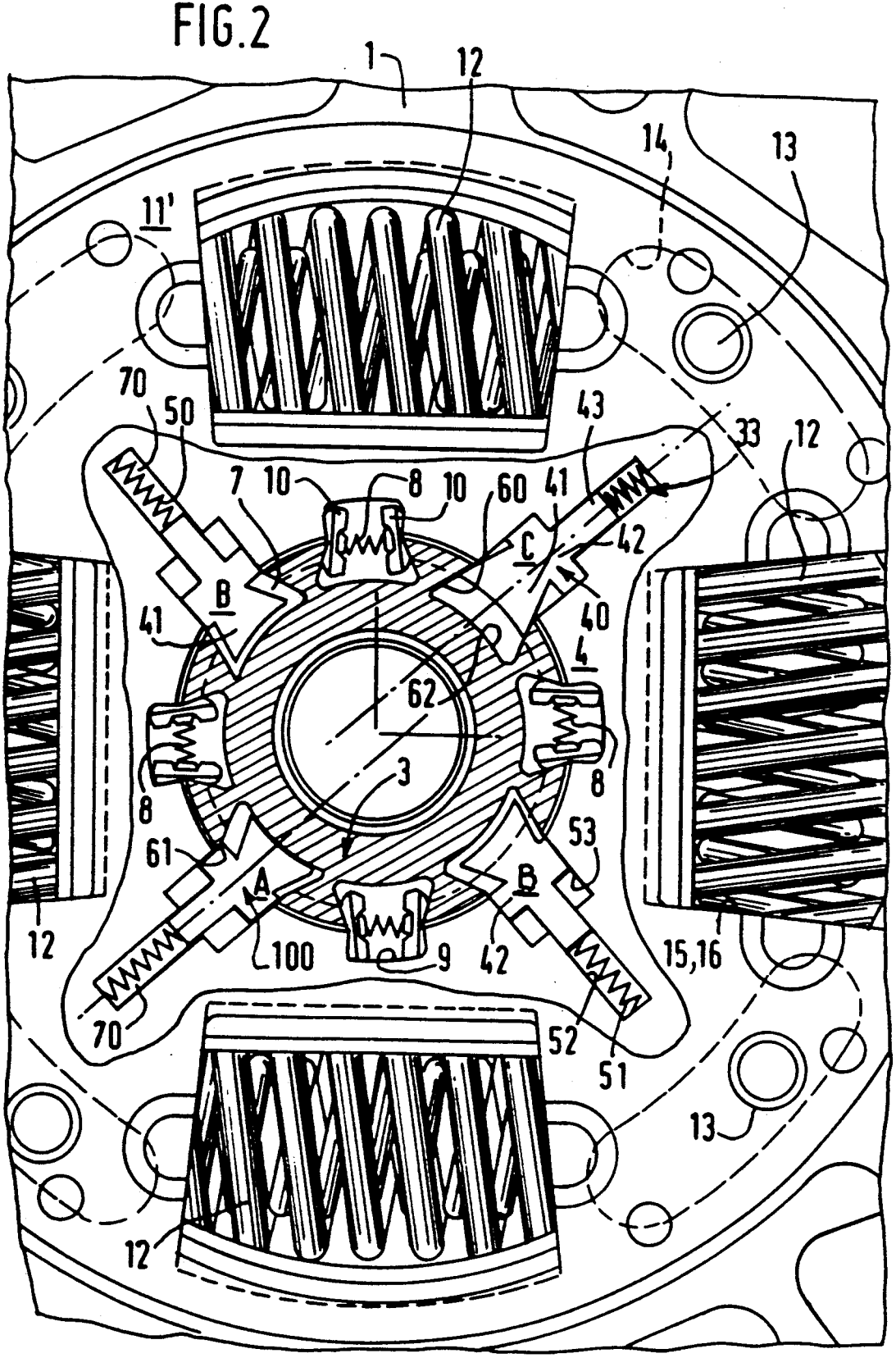
FIG. 2 is a front view, as seen in the direction of the arrow II in FIG. 1 but with some parts locally shown cut away to reveal the weights, the hub being sectioned.

In order to damp out slow running noises, second resilient means, acting circumferentially and being of low stiffness, are arranged in association with the loose meshing means 7. These resilient means here consist of four coil springs 8, spaced apart circumferentially at 90 degrees and mounted in slots 9 formed in the damper plate 4 and in the hub 3, with which they engage through thrust inserts 10 which are placed between the ends of the springs 8 and the edges of the slots 9. The inserts 10 are of dihedral or shallow V form as shown in FIG. 2.

The main damper is constructed as follows. Two guide rings 11 and 11' are mounted for rotational movement with respect to the damper plate 4 and against the action of first circumferentially acting resilient means 12, which here consist of coil springs having a substantially higher stiffness than the springs 8. This action again takes place within the limits of a predetermined angular displacement. The guide rings 11 and 11' are arranged axially on either side of the damper plate 4, and are coupled together at a fixed axial spacing by means of axial spacers 13, which also serve to secure the carrier plate 1. The latter is placed back to back with the guide ring 11', on the side of this guide ring which faces towards the damper plate 4. The spacers 13 extend through slots 14 formed in the damper plate 4 (FIG. 2), with a clearance around the spacers.

The limitation on the relative angular displacement between the damper plate 4 and the guide rings 11 and 11' is obtained by cooperation of the spacers 13 with the edges of the slots 14 or by full compression of the springs 12. These springs 12 are mounted in windows 15 and 16, which are arranged in register with each other and which are formed respectively in the guide rings 11, 11' and in the damper plate 4. The carrier plate 1 is also provided with windows 15 in which the springs 12 are received. The guide rings 11 and 11' freely surround the hub 3, without the intervention of any loose meshing means, while the damper plate 4 surrounds the hub 3 with the intervention of the loose meshing means 7.

An annular bearing 17, which is generally of L-shaped cross section, is interposed axially between the carrier plate 1 (and the guide ring 11' to which it is secured) and the damper plate 4, so as to constitute a transverse spacing ring. This bearing 17 is also inserted radially between the inner periphery of the guide ring 11' and the outer periphery of the hub 3. It is coupled in rotation with the guide ring 11'.

Friction rings 18 and 19, together with associated axially acting resilient means, are interposed between the other guide ring 11 and the damper plate 4, in order to introduce frictional forces. These axially acting resilient means consist, in this example, of two tabbed Belleville rings 20 and 21. The Belleville ring 20 bears on the guide ring 11 and biasses the friction ring 18 towards the damper plate 4, so as to grip the bearing 17 between the carrier plate 1 and the damper plate 4. The Belleville ring 21 bears on the guide ring 11 and biasses the friction ring 19 towards the flange 6, so that the bearing 17 is gripped between the guide ring 11' and the flange 6.

It can thus be seen that the friction clutch consists essentially of three coaxial parts, the first of which comprises the guide rings 11 and 11', the second part including the damper plate 4, and finally the third part comprising the hub 3. The guide rings 11 and 11' are thus moveable against the action of the first circumferentially acting resilient means, namely the springs 12, and of first friction means 22 which comprise the friction ring 18 with its associated Belleville ring 20 and the bearing 17.

Similarly, the hub 3 is moveable in rotation with respect to the damper plate 4 against the action of second circumferentially acting resilient means, namely the predamper springs 8, and of second friction means 5 comprising the friction ring 19 with its associated Belleville ring 21 and the bearing 17. The two friction means 22 and 5 are arranged radially one outside the other, with the rings 18 and 20 surrounding the rings 19 and 21.

The friction ring 18, which is preferably made of a synthetic material like the friction ring 19 and the bearing 17, has a plurality of integral projections in the form of bosses 26 which project axially and which are spaced regularly around a common pitch circle. Each of the bosses 26 extends through a cylindrical hole 27 formed in the guide ring 11, thus coupling the friction ring 18 with the latter for rotation with it. Similarly, the bearing 17 has further bosses 26 engaged in holes 27 formed in the guide ring 11'. In this connection, the two guide rings 11 and 11' are identical with each other.

The friction ring 19 has on its inner periphery an axial flange which is formed with local boss elements, each of which engages in a complementary recess formed in the guide ring 11 so as to couple the rings 19 and 11 together for simultaneous rotation. The bearings 17 and 19 are formed with rebates to receive the flange 6.

It will be understood that when the carrier plate 1 is displaced in rotation with respect to the hub 3, the guide rings 11 and 11' first form a unit with the damper plate 4, having regard to the stiffness of the springs 12 as compared with that of the springs 8. The damper plate 4 is displaced with respect to the hub 3 against the action of the springs 8, until the clearance in the loose meshing means 7 is taken up. Then in a second stage of operation, the springs 8 remaining compressed, the guide rings 11 and 11' are displaced rotationally with respect to the damper plate 4, against the action of the springs 12. Thus the rings 19 and 17 act first, while the ring 18 acts subsequently.

The friction clutch also includes at least one intervention member 100, the purpose or which is to modify the operating characteristics of the torsion damper over parts of the overall range of values of the angular displacement between the carrier plate 1 and the hub 3. The intervention member 100 is responsive to centrifugal force against the action of return means 33, and to this end it is moveable reversibly between a rest position and two successive working positions. The rest position corresponds to a first range of relatively low values of the rotational velocity of the assembly, in which the intervention member 100 modifies the operating characteristics of the torsion damping device. The working positions correspond to higher values of the speed of rotation.

The intervention member 100 includes at least one weight 40, which is radially moveable in a guide housing 50 formed in the damper plate 4. In this embodiment (FIG. 2) there are four weights 40. Each weight 40 includes a tenon 41, of generally trapezoidal shape and projecting at least partly from the inner periphery of the damper plate 4 as seen in FIG. 2.

The hub 3 has a set of mortices 60, each corresponding with a corresponding one of the tenons 41 and arranged on the outer periphery of the hub. The shape of each mortice 60 is trapezoidal so as to be complementary with that of the tenon 41; the latter penetrates into the mortice 60 with a circumferential and radial clearance, under the action of the associated return means 33, each of which comprises a compression spring 70 (FIG. 2) in this example. Each spring 70 bears at one end on the associated member 100 and at the other end on the damper plate 4 itself, so as to bias the tenon 41 towards the base 62 of the corresponding mortice 60. In the above mentioned first range of values of rotational velocity of the assembly, the tenon 41 engages the base 62.

In operation, the intervention member 100 is, as already mentioned, able to occupy either one of two working positions, namely an intermediate position and a terminal position. The intermediate position corresponds to a second range of values of rotational velocity of the assembly, greater than the values in the above mentioned first range in which the weights 40 lie in their rest position. In this intermediate position the tenon 41 of the member 100 lies in the mortice 60, but with a circumferential clearance so that it has effect on the torsion damping characteristics of the device. However, in its terminal position, which corresponds to a third range of values of rotational velocity greater than those of the second range, the member 100 once again does affect the operating characteristics, because of the way the tenon 41 then engages with the mortice 60.

To help in understanding this arrangement, FIG. 2 shows weights 40 in each of their different positions: thus the weight 40 indicated at A is shown in the rest position of the intervention member 100, while the two weights 40 marked B are seen in the intermediate working position of the member 100. Finally, the weight 40 marked C is shown in the terminal working position of the member 100. It will be noticed that the four mortices 60 are arranged alternately, in a circumferential sense, with the slots 9 in which the springs 8 are mounted. The slots 9 and the mortices 60 extend partly into the flange 6 and partly into the running portion of the hub 3, while axially the slots 9 and mortices 60 extend right through the hub 3.

Each weight 40 has, besides the tenon 41, an intermediate sliding portion 42, joined to the tenon 41, and a terminal tail portion 43 which, with the associated spring 70, constitutes the return means 33. The spring 70 bears on the end of the tail portion 43, the other end of the spring 70 bearing on the base 51 of the guide housing 50. This housing 50 has two portions 52 and 53, and comprises a slot which is formed transversely through the whole thickness of the damper plate 4. The slot portion 52 is narrower than the slot portion 53, its dimensions being adapted to those of the tail portion 43 so that the latter will slide in it; while the slot portion 53 has its dimensions adapted to the intermediate portion 42, with the latter projecting laterally with respect to the tail portion 43 on either side of the tail portion.

It will be noted that the open housing 50 is closed on both sides by radial portions of the bearing 17 and of the friction ring 18 respectively, the weight 40 being narrower than the housing 50. This is shown in FIG. 1. Thus the housing 50, extending radially, is open at the inner periphery of the damper plate 4 and closed at its outer end. It is arranged, as seen in FIG. 2, to lie between two consecutive ones of the springs 12.

Each mortice 60 has a radial portion 61 at its outer periphery. The width of this portion 61 is equal to that of the intermediate portion 42 of the weight 40 such as to give a narrow clearance. With this in view the portion 42 has two lateral, radially extending surfaces 44, complementary to those of the radial portion 61 of the mortice, which assists the freedom of movement of the weight 40.

The above arrangement enables each tenon 41, in the rest position (A), to be in frictional contact with the base 62 of the corresponding mortice 60, while the portion 42 is in contact with the radial mortice portion 61. The base 62 and the end of the tenon 41 facing it are preferably rounded as shown, so as to increase the contact area. The weight 40 and the mortice 60 are of course dimensioned accordingly, in such a way that the tenon 41 has a radial height smaller than that of the mortice 60. The rest position A is assumed by the members 100 in a running mode slower than the slow running mode of the engine, with the weight 40 being deployed against the spring 70 when the speed reaches a certain value.

In the intermediate service position (B), which occurs during the slow running mode of the engine, a circumferential clearance exists between each tenon 41 and the corresponding mortice 60, with the intermediate portion 42 of the weight 40 lying radially outside the mortice 60. This clearance allows the springs 8 to perform their normal function, and the clutch operates in the manner of a conventional friction clutch as described above. The weights 40 then form part of the loose meshing means with the hub 3 being able to be displaced circumferentially with respect to the damper plate 4.

It will be noted that, in FIG. 2, the clearance is not symmetrical on either side of the weight, in the median position, but it may be made symmetrical according to the requirements of particular applications.

In the third position, i.e. the terminal working position (C), for example after the accelerator has been released and then depressed again, the portion 42 is in contact with the base of the portion 53 of the housing which defines a shoulder, while the tenon 41 is in circumferential contact with the mortice 60. This third position C corresponds to a mode in which the speeds are higher than those of the slow running mode of the engine, and as can be seen, the tenon and mortice are then in a dovetail relationship.

As will be understood, the springs 70, as part of the return means 33, govern the movement of the weights 40 under the influence of centrifugal force. These springs are dimensioned accordingly.

The present invention is of course not limited to the embodiments described. In particular, the resilient means such as springs 8 may be part of a predamper having guide rings and damper plate, with the springs 8 disposed axially between the damper plate 4 and one of the guide rings 11 or 11', in the manner described in U.S. Pat. No. 4,860,871 and the corresponding published French patent application No. FR 2 611 245A, and in U.S. Pat. No. 4,883,156 and the corresponding published patent application No. DE 3 810 922A of the Federal Republic of Germany.

The damper plate 4 may be doubled up in the manner described in U.S. Pat. No. 4,698,045 and the corresponding published French patent application No. FR 2 566 497A.

The free end of each tenon 41 and the base of the corresponding mortice 60 may be rounded as seen in cross section. In a modification, teeth may be provided on these surfaces instead.

Figure 4:
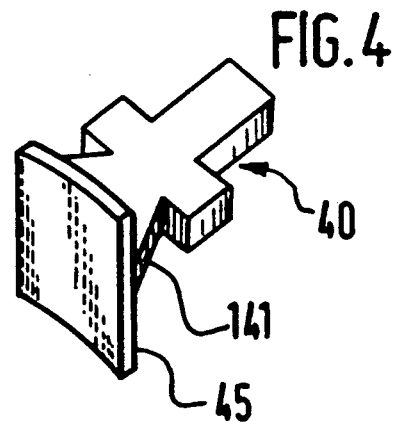
FIG. 4 is a view similar to FIG. 3 showing a weight in another embodiment.

In a further modification, as shown in FIG. 4 at 45, the end of the tenon, 141, may be enlarged so as to increase the contact area.

The springs 70 may all be made in one piece and may be synchronised with each other by any appropriate means. Finally, the carrier plate 1 need not necessarily carry friction liners 2: it may for instance be fixed directly on the crankshaft of the internal combustion engine of the vehicle.

What is claimed is:

1. A torsion damping device having: a first coaxial part comprising a hub; a second coaxial part comprising two guide rings and an annular damper plate between the guide rings, said first and second coaxial parts together defining loose meshing means coupling them coaxially together for relative rotation within the limits of a predetermined angular displacement; resilient means engaging both of said coaxial parts for acting circumferentially between them over at least a range of the said angular displacement; at least one generally radial guide housing carried fixedly by the damper plate and open at the inner periphery of the latter; an intervention member mounted in said guide housing for radial movement therein and comprising at least one weight formed with a trapezoidal tenon projecting from said inner periphery; return means engaging the damper plate and the intervention member for urging said intervention member radially inward; and at least one mortice carried by the hub and open radially outwardly for cooperating with a respective one of said tenon, said mortice being of trapezoidal shape complementary to said tenon, to define a base, whereby: in a first position corresponding to a first range of rotational velocities of the device said tenon lies in, and engages the base of, the associated mortice with circumferential clearance between said tenon and mortice; and said tenon being urged by centrifugal force against the return means radially outwardly to a second and a third position in succession, corresponding respectively to successively higher second and third ranges of said velocities; in said second position said tenon lies in the associated mortice with both circumferential and radial clearances between said tenon and mortice; and in said third position it engages the mortice in a wedging relationship, so that the intervention member cooperating with said mortice, modify the operating characteristics of the device, but in only said first and third positions.

2. A torsion damping device according to claim 1, wherein said mortice defines a radial portion at its outer periphery.

3. A torsion damping device according to claim 2, wherein said vase of each mortice is circular in form.

4. A torsion damping device according to claim 2, wherein said weight has an intermediate portion, a said tenon, and a tail portion, the intermediate portion being joined to and between the tenon and the tail portion.

5. A torsion damping device according to claim 4, wherein said guide housing comprises a first portion for receiving said tail portion of the corresponding weight, and a second portion leading from the first portion for receiving the intermediate portion of the weight.

6. A torsion damping device according to claim 5, wherein the tail portion of said weight has a free end and each of said guide housing has a base, said return means associated with the guide housing comprising a spring bearing at one end on said free end of the tail portion and at the other end on the base of the guide housing.

* * * * *